Aug. 20, 1946. H. S. JANDUS 2,405,956
BRAKE LEVER ASSEMBLY
Filed Aug. 5, 1944 2 Sheets-Sheet 2
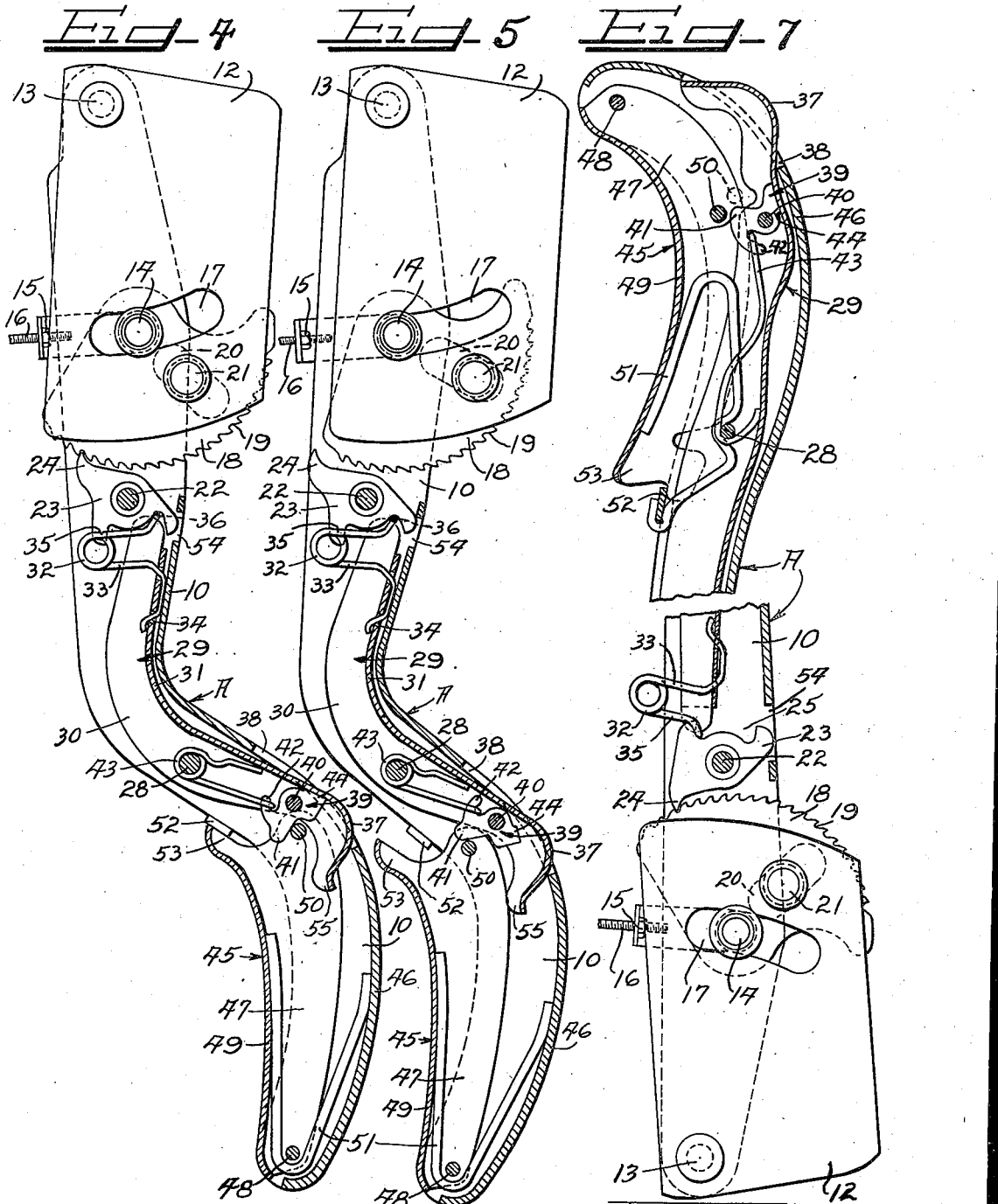
Inventor
Herbert S. Jandus
by Charles W. Hill Attys Patented Aug. 20, 1946

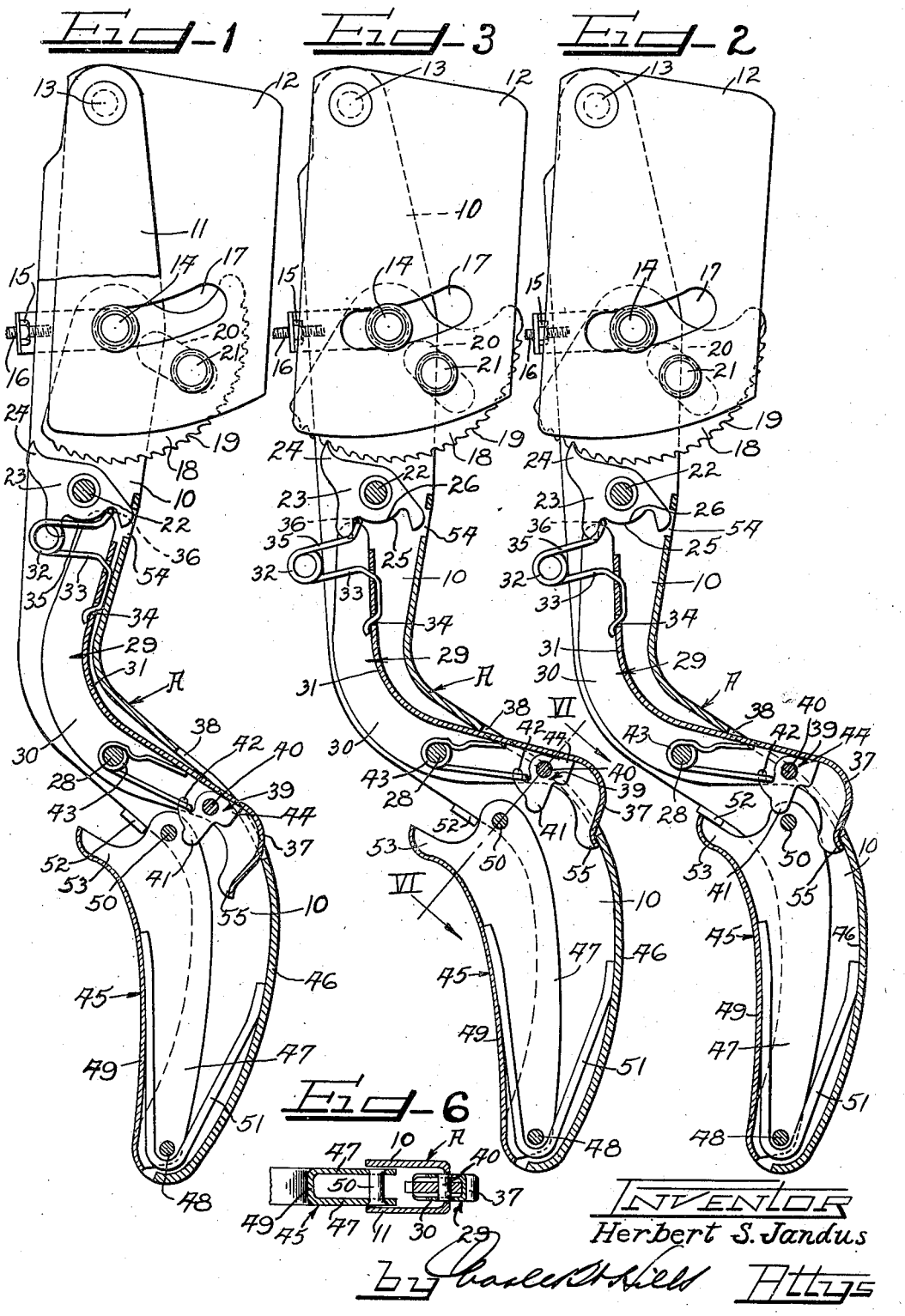

2,405,956

UNITED STATES PATENT OFFICE 2,405,956

BRAKE LEVER ASSEMBLY

Herbert S. Jandus, Detroit, Mich., assignor to Houdaille-Hershey Corporation, Detroit, Mich., a corporation of Michigan Application August 5, 1944, Serial No. 548,185

12 Claims. (Cl. 74—537)

My invention relates to a brake lever assembly, particularly to hand operated emergency brake lever assembly for automotive vehicles, such as disclosed in my copending application Serial No. 536,735 filed May 22, 1944, now Patent No. 2,377,690, dated June 6, 1945.

In my copending application a spring connection is provided between the setting lever and the pawl which snaps the pawl into either release position or into operative position and holds the pawl and lever against reverse movement after such setting, the setting lever being directly engageable at the front or rear of the brake lever for setting operation thereof into either position. My present invention covers improvements over my pending application structure.

An important object of the invention is to provide a pawl setting member on the brake lever and a separate control member, with the setting member operable solely by the driver's thumb for setting of the pawl into release position, and with the control member functioning to engage with the setting member for operation thereof for setting of the pawl into operative position when the brake lever is grasped by the driver.

A further object of the invention is to provide pawl release means on the brake lever operable by the driver's thumb, but effectively operable for release of the pawl only after the driver has fully grasped the brake lever.

Another object of the invention is to provide spring connection between the setting member and the pawl effective, after setting of the member and pawl into either release or active position, to hold them in such position, and with interconnecting means between the setting member and the control member effective upon operation of the control member when the brake lever is grasped for swing thereof for brake setting, to move the setting member for setting of the pawl into operative position, and to permit return of the control member to normal position after such setting of the setting lever and independently thereof.

The above referred to and other objects and features of the invention will be clearly apparent from the following detailed specification in connection with the accompanying drawings, on which drawings:

Figure 1 is a side elevation of a brake lever, partly in section, in full brake release position;

Figure 2 is a view like Figure 1 showing the lever having been swung to brake setting position just before release thereof by the driver;

Figure 3 shows the lever in set position after release by the driver;

Figure 4 shows the operation for releasing of the lever;

Figure 5 shows the lever after release of the pawl and movement of operating parts back toward the full release position;

Figure 6 is a section on plane VI—VI of Figure 3; and

Figure 7 is a side elevation, partly in section, of a truck type brake lever embodying the features of my invention.

Referring to the brake lever structures on Figures 1 to 6, the brake lever A is longitudinally of S-shape and of channel or U-shaped cross section, with side walls 10 and 11 at their upper portion thereof receiving between them the supporting plate 12 which may form part of a bracket secured in position behind the instrument board of an automotive vehicle, the walls 10 and 11 being fulcrumed at their upper ends to the plate 12 as by a rivet 13. Extending between the walls 10 and 11 a distance downwardly from the fulcrum connection 13 is a pin 14 from which extends the link 15 for connection by a rod or cable 16 with the brake to be controlled. The pin extends through an arcuate slot 17 in the plate 12 with its center of curvature in the fulcrum 13. On the pin 14 is also supported the ratchet sector 18 having the ratchet teeth 19. This ratchet sector has the slot 20 therethrough extending radially from the pin 14 and receiving a stud 21 extending from the plate 12. The arrangement thus far described is substantially like that disclosed in my Patent No. 2,120,362, dated June 14, 1938.

A pin 22 extending between the lever side walls 10 and 11 adjacent to the sector 18 supports the pawl 23. At its front end the pawl has a point 24 for ratchet engagement with the teeth 19 on the sector when the lever is swung for brake setting. In its lower side the pawl is cut away to leave the recess 25 extending forwardly and rearwardly of the fulcrum pin 22, the bottom surface 26 of the recess being shown as arcuate and centered in the axis of the fulcrum 22.

At the middle part of the S-shaped lower portion of the brake lever, a pin 28 extends between the side walls 10 and 11 to fulcrum the pawl actuating and setting lever 29 which is of U-shaped cross section with its side walls 30 extending forwardly between the forwardly extending side walls 10 and 11 of the lever A. At the upper end of the back wall 31 of the lever 29 is supported a spring 32, shown as of the hairpin type, whose lower leg 33 is inserted through and anchored in holes 34 in the wall 31, and whose upper leg 35 has its end 36 bent laterally at right angles to extend into the recess 25 of the pawl, the body of the spring being at one side of the pawl so that the pawl may rock its fulcrum pin 22.

The lower end portion 37 of the setting lever 29 is bent into the form of a knob or button 37 which may pass forwardly or rearwardly through an opening 38 in the back wall of the brake lever as the setting lever is rocked on its fulcrum 28. Within the button part of the setting lever is an abutment or detent member 39 of L-shape which is fulcrumed on a pin 40 extending between and secured at its ends in the side walls 30 of the setting lever, as shown on Figure 6. The leg 41 of the abutment member has a hook extension 42 on its upper side which receives one leg of the hairpin spring 43 anchored on the fulcrum 28 and whose other leg engages against the back wall 31 of the setting lever. The other leg 44 of the abutment member forms a foot which, by the pressure of the spring 43, is normally held against the back wall 31 of the setting lever.

A control lever 45 for the setting lever 29 is received in the grip end 46 of the brake lever A. This control lever is of U-cross section with its side walls 47 receiving a fulcrum pin 48 extending between and secured to the ends of the brake lever side walls 10 and 11, the front wall 49 of the control lever presenting a surface for engagement by the fingers of the driver when he grasps the grip end 46 of the brake lever. Between the upper end of the side walls 47 of the control lever is secured an abutment pin 50 which is disposed forwardly of the forward end of the abutment or detent member 39. A V-spring 51 between the brake lever and the control lever tends to swing the control lever forwardly, the forward swing being limited by the engagement of the upper end of the control lever side walls with abutment extensions 52 from the forward edges of the side walls of the brake lever. Rearward swing of the control lever is limited by the engagement of the extension or arm 53 on the control lever with the abutment extensions 52 on the brake lever.

Describing now the operation, Figure 1 of the drawings shows the lever in full brake release position, the pressure of the end 36 of the spring 32 against the pawl 23 at the rear end of the recess 25 holding the pawl withdrawn from the ratchet sector 18. The rear wall of the brake lever A has the slot 54 therein into which the tail end of the pawl extends for engagement with the upper edge of the slot to limit the rocking movement of the pawl. The force of the spring 32 will also hold the setting lever 29 at the limit of its clockwise rotation, with its upper end against the rear wall of the brake lever and with the button end 37 within the brake lever.

If it is now desired to set the brake, the driver will graps the grip end 46 of the brake lever, and in so doing he will swing the control lever 45 rearwardly to its inner position shown on Figure 2, with the abutment arm of the control lever against the stop extensions 52 on the brake lever. When a control lever is thus swung rearwardly by the grasping of the grip end of the control lever, the pin 50 on the control lever will engage the abutment or detent member 39, and the setting lever 29 will be rotated in counterclockwise direction into the position shown on Figure 2. During such rotation of the setting lever, the end 36 of the spring 32 will be moved forwardly along the convex or arcuate bottom surface 26 of the recess 25, and after the spring end 36 has passed the middle or high point of the surface 26, it will engage with the pawl at the front end of the recess 25 to quickly snap the pawl into the operative position shown on Figure 2, ready for engagement with the ratchet teeth, the rotation of the setting lever for this movement of the pawl being limited by the engagement of the abutment end 55 on the setting lever with the back wall of the brake lever below the slot 38. After the driver has grasped the brake lever for swinging of the control lever for setting of the pawl into operative position, the brake lever is swung rearwardly for engagement of the pawl with the teeth and setting of the brake, as shown on Figure 2, and then, when the driver's hand is released from the brake lever, the spring 51 will return the control lever back to its forward position as shown on Figure 3, the brake lever then being in its brake setting position. When the control lever was swung rearwardly by the grasp of the driver and the setting lever thereby swung in counterclockwise direction for setting of the pawl to its operative position, the abutment or detent member 39 was moved upwardly with the setting lever out of the path of the control lever pin 50 so that the control lever was free to be swung by its spring 51 back into its forward position shown on Figure 3. As shown on Figure 3, the rotation of the setting lever 29 by the control lever has brought the button end 37 of the setting lever into its out position to project beyond the back wall of the brake lever, and the setting will be held in this position by the spring 32.

If it is now desired to release the brake, the driver first grasps the grip end 46 of the brake lever to swing the control lever from its out position shown in Figure 3 to its in position shown in Figure 2 in order that the pin 50 on the control lever may be rearwardly of the leg 41 of the abutment or detent member 39, and he then depresses the button 37 for clockwise rotation of the setting lever 29, the detent leg 41 then moving down forwardly of the pin 50, as shown on Figure 4. This clockwise rotation of the setting lever will bring the end 36 of the spring 32 back against the pawl at the rear end of the recess 25, the pressure of the spring 32 against the pawl rearwardly of the pawl fulcrum then tending to rock the pawl counterclockwise into its releasing position. However, the pressure of the spring against the pawl may not be sufficient to release the pawl from the ratchet sector against the resistance of the pressure against the pawl point by the sector tooth, but after the button 37 has been depressed the driver will swing the brake lever a sufficient distance rearwardly to release this pressure against the pawl so that the spring 32 may then snap the pawl quickly into its inoperative or releasing position shown on Figure 5. Now, when the driver lets go of the brake lever, the spring 51 will swing the control lever out back to normal position and during such movement, as shown on Figure 5, the pin 50 engages against the back of the detent leg 41 to rock the detent out of the way against the pressure of the spring 43 which will then rock the detent back to normal position. When the control lever reaches its normal position, the pin 50 will be in front of the detent member, as shown on Figure 1, ready for the next brake-setting operation.

Should the operator inadvertently reverse the sequence of operation for brake release and depress the button 37 for clockwise rotation of the setting lever before retracting the control lever, the control lever pin 50 would engage the detent member 39 and swing the setting lever back into brake setting position, the parts being then in the position shown on Figure 2, but now, when the button 37 is depressed the setting lever will be rotated for release of the pawl. The setting lever 29 is moved into its pawl release or off position solely by the pressure of the driver's thumb on the button end 37, while the movement of the setting lever for movement of the pawl to operative or setting position is effected solely by the operation of the control lever when the operator grasps the brake lever.

Figures 1 to 6 show the brake lever extending downwardly from its support behind the vehicle instrument panel, while Figure 7 discloses the truck type brake lever extending upwardly from a fulcrum support in the driver's compartment. Except for the slight change in shape and location of some of the parts, the truck type lever shown on Figure 7 comprises the same structural parts as the lever in Figures 1 to 6, and the same reference numerals are therefore used. The setting lever 29 of Figure 7 extends upwardly from its fulcrum pin 28 for exposure of its button end 37 at the slot 38 in the grip end 46 of the brake lever. The lever is shown in brake setting position, corresponding to the position of the lever shown on Figure 3. For release of the brake, the grip end of the lever on Figure 7 is grasped for inward swing of the control lever 45 to carry the pin 50 out of the path of the abutment 39 so that the button end 37 of the setting lever may be depressed by the thumb for setting of the setting lever into release position relative to the pawl, a slight swing of the brake lever then releasing the pressure on the pawl so that the spring 32 may snap the pawl into release position. When the driver now lets go of the brake lever, the control lever 45 will be returned by the spring 51 to its normal position, the pin 45 on the control lever, during such return of the control lever, wiping against and passing the detent member 39 to be in front of the detent member ready for the next brake setting operation. When it is desired to set the brake, the grip end 46 of the brake lever is grasped for inward swing of the control lever 45, the engagement of the pin 50 with the detent member 39 then causing the setting lever to be rotated to the position shown on Figure 7 with the button end 37 of the lever outside of the slot 38 and the spring 32 at the other end of the lever in engagement with the pawl at the outer end of the recess 25 for setting of the pawl into its outward position for cooperation with the teeth on the ratchet sector.

I have shown a practical and efficient embodiment of the features of my invention, but I do not desire to be limited to the exact construction and arrangement and operation shown and described as changes and modifications may be made without departing from the scope of the invention and defined by the appended claims.

I claim as my invention:

1. A brake lever assembly comprising a brake lever fulcrumed at one end and having a grip portion at its other end, a pawl on said brake lever, a ratchet member in the path of said pawl member for engagement thereby for brake setting, a setting lever fulcrumed on said brake lever and connected at one end to said pawl and being in pawl release position when said brake lever is in brake release position, a control lever fulcrumed at its outer end on the outer end of said grip portion, and interengageable means on the inner end of said control member and said setting lever which become engaged, when the grip portion and control lever are grasped by the driver for swing of the brake lever for brake setting, to move said setting lever for setting of said pawl to operative position for engagement with the ratchet sector teeth.

2. A brake lever assembly comprising a brake lever fulcrumed at one end and having a grip portion at its other end, a pawl on said brake lever, a ratchet member in the path of said pawl member for engagement thereby for brake setting, a setting lever fulcrumed on said brake lever and connected at one end to said pawl and being normally in pawl release position, a control lever fulcrumed at its outer end on the outer end of said grip portion, and interengageable means on the inner end of said control member and said setting lever which become engaged, when the grip portion and control lever are grasped by the driver for swing of the brake lever for brake setting, to move said setting lever for setting of said pawl to operative position for engagement with the ratchet sector teeth, and means independent of said connection and control lever for holding said setting lever in such pawl setting position.

3. A brake lever assembly comprising a support, a brake lever fulcrumed at one end on said support for swing thereon, a pawl on said brake lever, a ratchet sector in the path of said pawl for engagement by the pawl for brake setting, a setting lever fulcrumed on said brake lever and having connection at one end with said pawl, a control lever fulcrumed on the other end of said brake lever and terminating adjacent to the other end of said setting lever, spring means normally holding said control lever swung away from said brake lever, normally disconnected interengageable means between the adjacent ends of said setting lever and said control lever whereby when said brake lever is grasped for swing thereof for brake setting said control lever will be swung toward said brake lever for engagement of said interengageable means and movement thereby of said setting lever for setting of said pawl into position for engagement with the ratchet sector teeth, said other end of said setting lever being accessible for thumb engagement for movement thereof in reverse direction.

4. A brake lever assembly comprising a brake lever having a grip end and fulcrumed at its other end to a support for swing thereon, a pawl on the brake lever, a ratchet member having teeth thereon for engagement by the pawl for brake setting, a setting lever on said brake lever connected with said pawl, a control lever fulcrumed at its outer end to the outer end of said grip end to project in front of said grip end for engagement by the driver's hand for rearward movement when the brake lever is pulled for brake setting, said setting lever being in the path of the rearward movement of said control lever whereby when said brake lever is pulled for brake setting said control lever will engage with said setting lever to move said setting lever for setting of the pawl from release position into operative position for engagement with the ratchet teeth.

5. A brake lever assembly comprising a brake lever having a grip end and fulcrumed at its other end to a support for swing thereon, a pawl on the brake lever, a ratchet member having teeth thereon for engagement by the pawl for brake setting, a setting lever on said brake lever connected with said pawl, a control lever fulcrumed at its outer end to the outer end of said grip end to project in front of said grip end for engagement by the driver's hand for rearward movement when the brake lever is pulled for brake setting, said setting lever being in the path of the rearward movement of said control lever whereby when said brake lever is pulled for brake setting said control lever will engage with said setting lever to move said setting lever for setting of the pawl from release position into operative position for engagement with the ratchet teeth, means yieldably holding said setting lever in its position of setting by said control lever, said setting lever when thus set by said control lever being accessible at the rear of the grip end of the brake lever for thumb engagement for moving of said setting lever in reverse direction.

6. A brake lever assembly comprising a fulcrumed brake lever having a grip end, a pawl on said lever and a ratchet member in the path thereof, a setting lever on said brake lever for setting of said pawl for release from or for cooperation with said ratchet member, yieldable means for holding said setting lever and pawl in either of the set positions, a control member on said brake lever in front of the grip end thereof and spring means normally holding it projected forwardly of the grip end, an abutment member on said setting lever in the path of movement of said control member whereby when said brake lever is pulled for brake setting said control member will be moved into engagement with said abutment member for setting of the setting member for pawl engagement with the ratchet member, said setting lever when thus set being accessible at the rear of the brake lever for finger operation in reverse direction for release of the pawl after said brake lever has been grasped and swung for release of brake pressure from the pawl end, said abutment on said setting lever being in the path of return movement to normal of said control member after setting of the setting lever for pawl release, said abutment member being yieldably mounted to permit return of the control member to its normal position.

7. In a brake lever assembly of the type disclosed in which a setting lever controls the setting of a pawl into brake release or brake setting position and is accessible for finger operation from the rear side of the brake lever for movement into release position, a control member on the brake lever separate from said setting lever and located at the front of and extending the full length of the grip end of the brake lever, spring means normally holding said control member projected forwardly of the brake lever grip end, said setting lever being in the path of rearward movement of said control member whereby upon grasping said grip end preparatory to pull on said brake lever for brake setting said control member will be moved into engagement with said setting lever for setting thereof into brake setting position.

8. In a brake lever of the type described in which a setting lever controls the setting of a pawl into release position or brake setting position, means yieldably holding said setting lever in either of its set positions, a control lever on the brake lever extending the full length of and in front of the grip end of the brake lever and a spring normally holding it projected forwardly on the grip end, an abutment on said control lever, a pivoted abutment on said setting lever normally spring held in the path of the control lever abutment whereby when said brake lever is grasped and pulled for brake setting said abutments will engage for movement of the setting lever for setting of the pawl into position for brake setting, said setting lever after setting thereof for brake setting being exposed at the rear of the brake lever grip end for finger manipulation for reverse movement after said brake lever has been grasped for release movement thereof, said pivoted abutment being in front of the control lever abutment after such grasping of the control lever whereby, after finger setting of the release lever to release position after grasping of the brake lever said control lever abutment may move past the pivoted abutment for return to its normal position.

9. A brake lever assembly comprising a brake lever fulcrumed on a support, a pawl on said lever, a member engageable by said pawl for brake setting, a setting lever on said brake lever, a snap action spring connection between said setting lever and said pawl operable, when said setting lever is swung for either pawl release or pawl operation, to first set the pawl and then to hold the pawl and setting lever against reverse movement, said setting lever being movable by finger pressure from the rear side of said brake lever from its pawl operation position to its pawl release position, and a control member separate from said setting lever and forming the front part of the grip portion of said brake lever and movable, when the brake lever is grasped, to engage said setting lever to effect movement thereof from pawl release position to pawl operating position.

10. In a brake assembly, a support having a clutch element thereon, a brake lever fulcrumed on said support for forward or rearward swing, a clutch member on said lever, a setting member on said lever for said clutch member for setting thereof to clutching or unclutching position relative to said clutch element, a control member movable on the grip end of said lever and normally spring held in outer position but swingable inwardly when the grip end is grasped for brake setting swing of the lever, abutments on said setting member and said control member disconnected from each other when said setting member is in unclutching position but being brought into engagement when said control member is moved by the grasping of the grip end of the lever whereby said setting member will be moved to clutching position for clutching engagement of the clutch member with the clutch element for brake setting.

11. A brake assembly comprising a clutch element, a lever fulcrumed for forward and rearward swing, a clutch member on said lever for cooperation with said clutch element, a setting member on said lever for said clutch member movable for setting of said clutch member into clutching or unclutching position relative to said clutch element, a control member on the grip end of said lever normally spring held in outer position but swingable inwardly when the grip end of the lever is grasped for brake setting swing of the lever, abutments on said setting member and said control member, said abutments being normally disengaged but arranged for a period of engagement with each other and then release from each other when said control member is swung inwardly, whereby said setting member will be moved into position for setting of said clutch member for clutching engagement with said clutch element and said control member will then be free for spring return to its normal position.

12. A brake lever assembly comprising a support providing a clutch element, a brake lever fulcrumed on said support and having a clutch member pivoted thereon for cooperation with said clutch element, a setting member movable on said lever and having snap action spring connection with said clutch member whereby after initial movement of said setting member said clutch member will be quickly snapped into unclutching or clutching position relative to said clutch element, a control member on the grip end of said lever normally spring held outwardly away from the setting member when said setting member is in unclutching position but swingable inwardly into engagement with said setting member for initial movement thereof to clutching position when said lever is grasped preparatory to swing thereof for brake setting.

HERBERT S. JANDUS.